US010003811B2

(12) United States Patent
Sadhwani et al.

(10) Patent No.: US 10,003,811 B2
(45) Date of Patent: Jun. 19, 2018

(54) PARALLEL PROCESSING OF A VIDEO FRAME

(71) Applicant: Microsoft Technology Licensing, LLC, Redmond, WA (US)

(72) Inventors: Shyam Sadhwani, Bellevue, WA (US); Sudhakar Prabhu, Redmond, WA (US); Carol Greenbaum, Seattle, WA (US); Saswata Mandal, Bellevue, WA (US); Yongjun Wu, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 58 days.

(21) Appl. No.: 14/842,823

(22) Filed: Sep. 1, 2015

(65) Prior Publication Data
US 2017/0064320 A1 Mar. 2, 2017

(51) Int. Cl.
*G06F 15/80* (2006.01)
*H04N 19/436* (2014.01)
(Continued)

(52) U.S. Cl.
CPC ............. *H04N 19/436* (2014.11); *G06T 1/20* (2013.01); *H04N 19/423* (2014.11); *G06T 2200/28* (2013.01)

(58) Field of Classification Search
CPC ..... G06T 1/20; G06T 15/005; G06T 2210/52; G06T 2207/10016; G06T 15/80;
(Continued)

(56) References Cited

U.S. PATENT DOCUMENTS 8,005,149 B2   8/2011   Lerner et al.
8,218,642 B2   7/2012   Gao et al.
(Continued)

FOREIGN PATENT DOCUMENTS

EP    2046050 A2    4/2009
WO    2005109900 A1   11/2005
(Continued)

OTHER PUBLICATIONS

Chen, et al., "Exploiting Multi-level Parallelism for Low-latency Activity Recognition in Streaming Video", In Proceedings of the first annual ACM SIGMM conference on Multimedia systems, Feb. 22, 2010, 13 pages.
(Continued)

*Primary Examiner* — Xilin Guo

(57) ABSTRACT

A graphics pipeline with components that process frames by portions (e.g., pixels or rows) or slices to reduce end-to-end latency. Components of a pipeline process portions of a same frame at the same time. For example, as graphics data for a frame is being generated and fills a framebuffer, once a certain portion of video data less than the whole frame (slice or sub-frame) becomes available, before the corresponding frame is finished filling the framebuffer, the next pipeline component after the framebuffer, for instance a video processor for color conversion or an encoder, begins to process the portion of the frame. While one portion of a frame is accumulating in the frame buffer, another portion of the same frame is being encoded by an encoder, and another portion of the frame might be being packaged by a multiplexer, and a network socket might start streaming the multiplexed portion.

19 Claims, 8 Drawing Sheets

(51) Int. Cl.
*G06T 1/20* (2006.01)
*H04N 19/423* (2014.01)

(58) Field of Classification Search
CPC . G06T 15/205; G06T 15/503; G06T 2200/28; G09G 5/363; G09G 2360/18; G09G 2360/02; G09G 5/00; G09G 5/393; H04N 19/176; H04N 19/436; H04N 19/172; H04N 19/46; H04N 19/463; H04N 19/52; H04N 19/124; H04N 7/50; H04N 19/107; H04N 19/164; H04N 19/174; H04N 19/65; H04N 7/26; H04N 19/00; H04N 21/236; H04N 21/434; H04N 19/44; H04N 19/70; H04N 21/242; H04N 21/44004; H04N 21/2365; H04N 21/4392; H04N 19/423
See application file for complete search history.

(56) References Cited

U.S. PATENT DOCUMENTS

| | | | |
|---|---|---|---|
| 8,396,122 B1 | 3/2013 | Taylor | |
| 8,416,857 B2 | 4/2013 | Au et al. | |
| 8,451,905 B1 | 5/2013 | Rajagopalan et al. | |
| 8,661,496 B2 | 2/2014 | Perlman et al. | |
| 8,711,923 B2 | 4/2014 | Perlman et al. | |
| 8,831,108 B2 | 9/2014 | Duenas et al. | |
| 8,964,830 B2 | 2/2015 | Perlman et al. | |
| 8,971,414 B2 | 3/2015 | Meggers | |
| 2004/0151390 A1* | 8/2004 | Iwamura | G06F 3/1462 382/236 |
| 2004/0218673 A1 | 11/2004 | Wang et al. | |
| 2007/0091102 A1* | 4/2007 | Brothers | G06F 9/3879 345/506 |
| 2007/0153906 A1* | 7/2007 | Petrescu | H04N 19/61 375/240.24 |
| 2007/0206871 A1* | 9/2007 | Jalil | H04N 19/176 382/233 |
| 2009/0052537 A1 | 2/2009 | Burazerovic et al. | |
| 2010/0166068 A1 | 7/2010 | Perlman et al. | |
| 2011/0002376 A1 | 1/2011 | Ahmed et al. | |
| 2011/0263332 A1 | 10/2011 | Mizrachi | |
| 2011/0302395 A1* | 12/2011 | Hall | G06F 9/3009 712/226 |
| 2012/0170667 A1* | 7/2012 | Girardeau, Jr. | H04N 7/50 375/240.25 |
| 2012/0243602 A1 | 9/2012 | Rajamani et al. | |
| 2013/0058394 A1 | 3/2013 | Nilsson et al. | |
| 2013/0111051 A1 | 5/2013 | Yaron et al. | |
| 2014/0187331 A1 | 7/2014 | Kim et al. | |
| 2014/0269917 A1 | 9/2014 | Van der Laan | |
| 2014/0344469 A1 | 11/2014 | Nicholls | |
| 2015/0003520 A1 | 1/2015 | Mody | |
| 2015/0103909 A1 | 4/2015 | Pandey et al. | |
| 2016/0014421 A1* | 1/2016 | Cote | H04N 19/196 382/170 |
| 2016/0371808 A1* | 12/2016 | Croxford | G06T 1/20 |

FOREIGN PATENT DOCUMENTS

| | | |
|---|---|---|
| WO | 2012040565 A1 | 3/2012 |
| WO | 2013107906 A2 | 7/2013 |
| WO | 2013166089 A1 | 11/2013 |

OTHER PUBLICATIONS

Baharloo, Cameron, "Parallelism in Video Streaming", Retrieved on: Jun. 22, 2015 Available at: http://www.sjsu.edu/people/robert.chun/courses/CS259Fall2013/s3/B.pdf.

"International Search Report and Written Opinion Issued in PCT Application No. PCT/US2016/054037", dated Jan. 2, 2017, 13 Pages.

"International Search Report and Written Opinion Issued in PCT Application No. PCT/US2016/038876", dated Sep. 6, 2016, 16 Pages.

Fidler, et al., "Efficient Smoothing of Robust VBR Video Traffic by Explicit Slice-based Mode Type Selection", In Proceeding of the 4th IEEE Conference on Consumer Communications and Networking, Jan. 1, 2007, pp. 880-884.

Hannuksela, et al., "Isolated Regions in Video Coding", In Proceeding of the IEEE Transactions on Multimedia vol. 6, Issue 2, Apr. 2004, 26 Pages.

Wang, et al., "Error-robust Video Coding using Isolated Regions", In Proceeding of Joint Video Team (JVT) of ISO/IEC MPEG & ITU-T VCEG, May 6, 2002, 12 Pages.

Wang, et al., "Isolated Regions: Motivation, Problems, and Solutions", In Proceeding of (JVT) of ISO/IEC MPEG & ITU-T VCEG, May 6, 2002, 14 Pages.

Yao Wang, Multimedia Communications Systems II—Video Coding Basics. http://eeweb.poly.edu/~yao/EE4414/video_coding.pdf, Polytechnic University, Brooklyn, New York, 2003.

H.264 / MPEG-4 AVC—Course material for TSBK35: Audio and Image Compression, http://www.bk.isy.liu.se/courses/tsbk35/material/h264.pdf, Linkoping University, Linkoping, Sweden, 2004.

"Understanding-and Reducing-Latency in Video Compression Systems", In White Paper, Oct. 2, 2013, 4 pages.

* cited by examiner

PARALLEL PROCESSING OF A VIDEO FRAME

BACKGROUND

Computing devices that generate and encode video have been constructed with a pipeline architecture where components cooperate to concurrently perform operations on different video frames. The components typically include a video generating component, a framebuffer, an encoder, and possibly some other components that might multiplex sound data, prepare video frames for network transmission, perform graphics transforms, etc. Typically, the unit of data dealt with by a graphics pipeline has been the video frame. That is, a complete frame fills a framebuffer, then the complete frame is passed to a next component, which may transform the frame and only pass the transformed frame to a next component when the entire frame has been fully transformed.

This frame-by-frame approach may be convenient for the design of hardware and of software to drive the hardware. For example, components of a pipeline can all be driven by the same vsync (vertical sync) signal. However, there can be disadvantages in scenarios that require real-time responsiveness and low latency. As observed only by the instant inventors, the latency from (i) the occurrence of an event that causes graphics (video frames) to start being generated at one device to (ii) the time at which the graphics is displayed at another device, can be long enough to be noticeable. Where the event is a user input to an interactive graphics-generating application such as a game, this latency can cause the application to seem unresponsive or laggy to the user. As only the inventors have appreciated, the time of waiting for a framebuffer to fill with a new frame before the rest of a graphics pipeline can process (e.g., start encoding) the new frame, and the time of waiting for a whole frame to be encoded before a network connection can start video streaming, can contribute to the overall latency.

In addition to the foregoing, to encode video for streaming over a network or a wireless channel, it has become possible to perform different types of encoding on different slices of a same video frame. For example, the ITU's (International Telecommunication Union) H.264/AVC and HEVC/H.265 standards allow for a frame to have some slices that are independently encoded ("ISlices"). An ISlice has no dependency on other parts of the frame or on parts of other frames. The H.264/AVC and HEVC/H.265 standards also allow slices ("PSlices") of a frame to be encoded based on other slices of a preceding frame with inter-frame prediction and compensation.

When a stream of frames encoded in slices is transmitted on a lossy channel, if an individual Nth slice of one frame is corrupted or dropped, it is possible to recover from that partial loss by encoding the Nth slice of the next frame as an ISlice. However, when an entire frame is dropped or corrupted, a full encoding recovery becomes necessary. Previously, such a recovery would be performed by transmitting an entire Iframe (as used herein, an "Iframe" will refer to either a frame that has only ISlices or a frame encoded without slices, and a "Pframe" will refer to a frame with all PSlices or a frame encoded without any intra-frame encoding). However, as observed only by the present inventors, the transmission of an Iframe can cause a spike in frame size relative to Pframes or frames that have mostly PSlices. This spike can create latency problems, jitter, or other artifacts that can be problematic, in particular for interactive applications such as games.

Described below are techniques related to implementing a graphics pipeline capable of starting to process (e.g., encode) a video frame before the video frame is complete.

SUMMARY

The following summary is included only to introduce some concepts discussed in the Detailed Description below. This summary is not comprehensive and is not intended to delineate the scope of the claimed subject matter, which is set forth by the claims presented at the end.

Embodiments relate to a graphics pipeline with components that process frames by portions or slices to reduce end-to-end latency in real-time video game scenarios and others. Two components of a graphics pipeline process portions of the same frame at the same time. For example, as graphics data for a frame is being generated and fills a framebuffer, once a certain portion of frame data less than the whole frame (e.g., a slice or sub-frame of a few pixel or block rows) becomes available, before the corresponding frame is finished filling the framebuffer, the next component in the pipeline after the framebuffer, for instance a video processor for color conversion, or an encoder, begins to process the portion of the frame. While one portion of a frame is accumulating in the frame buffer, another portion of the same frame is being encoded by an encoder, and another portion of the frame might be being packaged by a multiplexer, with fully pipelined and concurrent operations.

BRIEF DESCRIPTION OF THE DRAWINGS

The present description will be better understood from the following detailed description read in light of the accompanying drawings, wherein like reference numerals are used to designate like parts in the accompanying description.

Many of the attendant features will be explained below with reference to the following detailed description considered in connection with the accompanying drawings.

DETAILED DESCRIPTION

Figure 1:
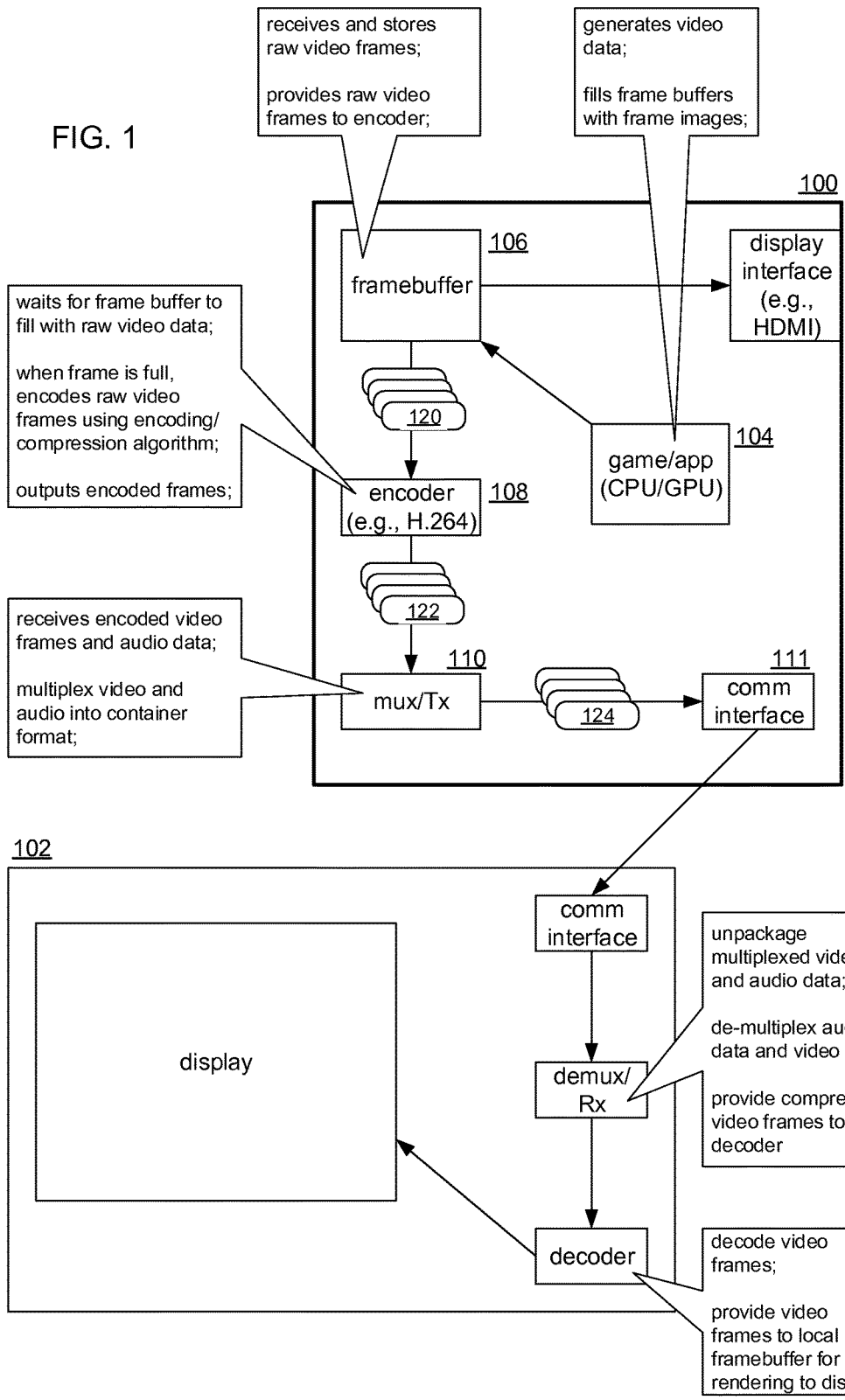
FIG. 1 shows a host transmitting a video stream to a client.

FIG. 1 shows a host 100 transmitting a video stream to a client 102. The host 100 and client 102 may be any type of computing devices. An application 104 is executing on the host 100. The application 104 can be any code that generates video data, and possibly audio data. The application 104 will generally not execute in kernel mode, although this is possible. The application 104 has logic that generates graphic data in the form of a video stream (a sequence of 2D frame images). For instance, the application 104 might have logic that interfaces with a 3D graphics engine to perform 3D animation which is rendered as 2D images. The application 104 might instead be a windowing application, a user interface, or any other application that outputs a video stream.

The application 104 is executed by a central processing unit (CPU) and/or a graphics processing unit (GPU), perhaps working in combination, to generate individual video frames. These raw video frames (e.g., RGB data) are written to a framebuffer 106. While in practice the framebuffer 106 may be multiple buffers (e.g., a front buffer and a back buffer), for discussion, the framebuffer 106 will stand for any type of buffer arrangement, including a single buffer, a triple buffer, etc. As will be described, the framebuffer 106, an encoder 108, and a transmitter/multiplexer (Tx/mux) 108 work together, with various forms of synchronization, to stream the video data generated by the application 104 to the client 102.

The encoder 108 may be any type of hardware and/or software encoder or hybrid encoder configured to implement a video encoding algorithm (e.g., H.264 variants, or others) with the primary purpose of compressing video data. Typically, a combination of inter-frame and intra-frame encoding will be used.

The Tx/mux 108 may be any combination of hardware and/or software that combines encoded video data and audio data into a container, preferably of a type that supports streaming. The following are examples of suitable formats AVI (Audio Video Interleaved), FLV (Flash Video), MKV (Matroska), MPEG-2 Transport Stream, MP4, etc. The Tx/mux 108 may interleave video and audio data and attach metadata such as timestamps, PTS/DTS durations, or other information about the stream such as a type or resolution. The containerized (formatted) media stream is then transmitted by various communication components of the host 100. For example, a network stack may place chunks of the media stream in network/transport packets, which in turn may be put in link/media frames that are physically transmitted by a communication interface 111. In one embodiment, the communication interface 111 is a wireless interface of any type.

As will be explained with reference to FIG. 2, in previous devices, the type of pipeline generally represented in FIG. 1 would operate on a frame-by-frame basis. That is, frames were processed as discrete units during respective discrete cycles. Although the devices in FIG. 1 have similarities to such prior devices, they also differ from prior devices in ways that will be described herein.

Figure 2:
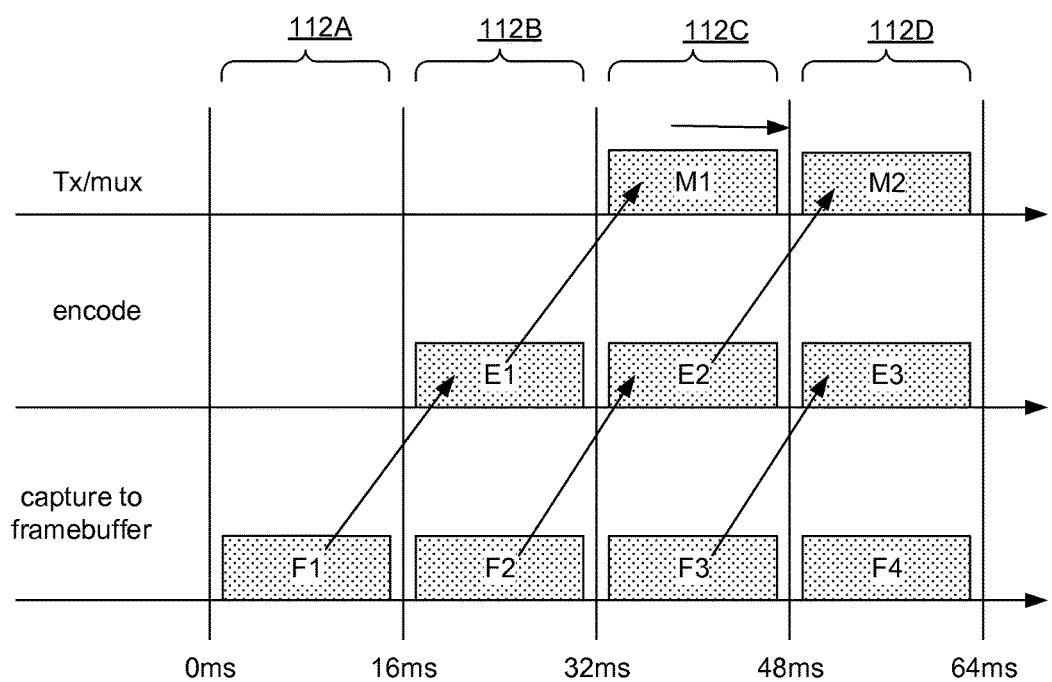
FIG. 2 shows a timeline of processing by a frame-by-frame pipeline architecture.

FIG. 2 shows a timeline of processing by a frame-by-frame pipeline architecture. With prior graphics generating devices, a refresh signal that corresponds to a display refresh rate drives the graphics pipeline. For example, for a 60 Hz refresh rate, a vsync (vertical-sync) signal is generated for every 16 ms refresh cycle 112 (112A-112D refer to individual cycles). Each refresh cycle 112 is started by a vsync signal and begins a new increment of parallel processing by each of (i) the capturing hardware that captures to the framebuffer 106, (ii) the encoder 108, and (iii) the Tx/mux 110. In FIG. 2, it is assumed that a new video stream is starting, for example, in response to a user input. As will be explained, a graphics pipeline corresponding to the example of FIG. 2 requires two refresh cycles 112 before the corresponding video stream can begin transmitting to the client 102.

At the beginning of the first refresh cycle 112A after the user input, each component of the graphics pipeline is empty or idle. During the first refresh cycle 112A, the framebuffer 106 fills with the first frame (F1) of raw video data. During the second refresh cycle 112B, the encoder 108 begins encoding the frame F1 (forming encoded frame E1), while at the same time the framebuffer 106 begins filling with the second frame (F2), and the Tx/mux 110 remains idle. During the third refresh cycle 112C, each of the components is busy: the Tx/mux 110 begins to process the encoded frame E1 (encoded F1, forming container frame M1), the encoder 108 encodes frame F2 (forming a second encoded frame E2), and the framebuffer 106 fills with a third frame (F3). The fourth refresh cycle 112D and subsequent cycles continue in this manner until the framebuffer 106 is empty. This is assumes that the encoder takes 16 ms to encode a frame. However, if the encoder is capable to encoding faster, the Tx/mux can start as soon as the encoder is finished. Due to power considerations, the encoder can be typically run so that it can encode a frame in 1 vsync period.

It is apparent that a device configured to operate as shown in FIG. 2 has an inherent latency of approximately two refresh cycles between the initiation of video generation (e.g., by a user input or other triggering event) and the transmission of the video. For some applications such as interactive games, this delay to prime the graphics pipeline can be noticeable and the experience of the user may not be ideal. As will be explained with reference to FIGS. 1, 3, and 4, this latency can be significantly reduced by configuring the host 100 to process frames in piecewise fashion where portions of a same frame are processed in parallel at different stages of the pipeline.

Figure 3:
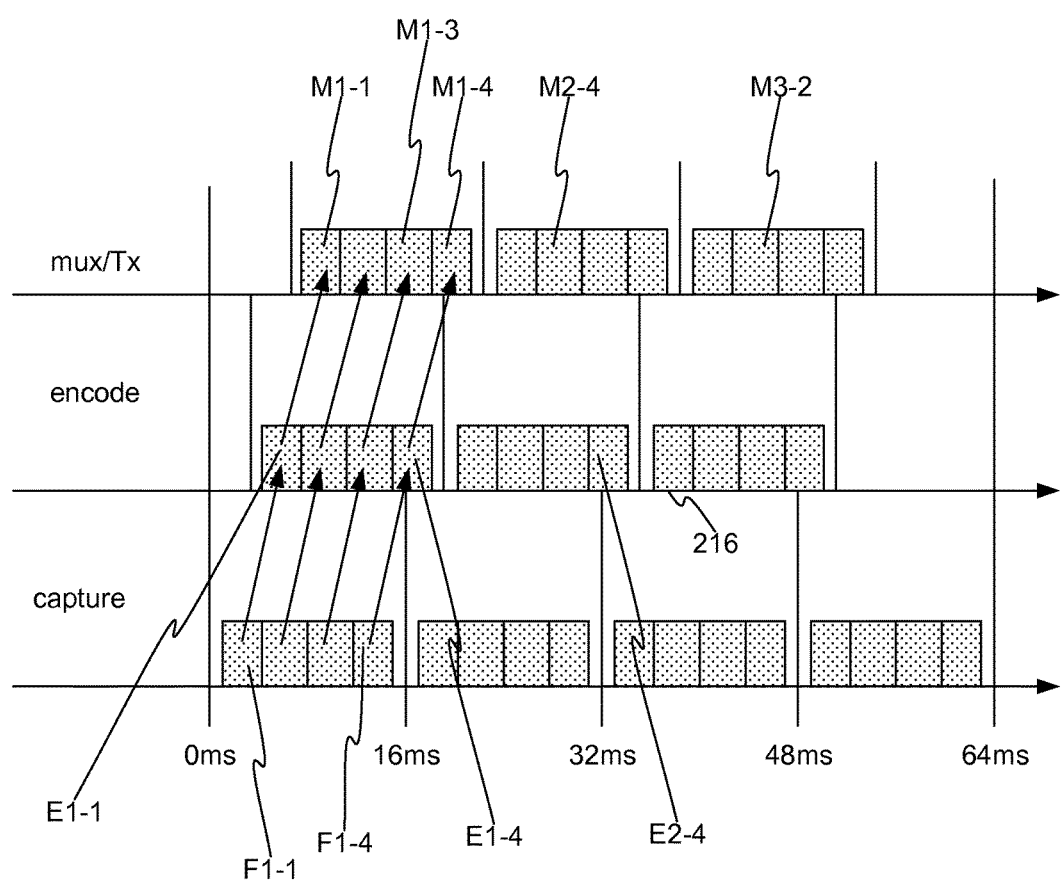
FIG. 3 shows a timeline where video frames are processed in incremental portions.

FIG. 3 shows a timeline where video frames are processed in incremental portions. In the example of FIG. 3, each frame has 4 portions (N=4). However, any number greater than two may be used for N, with the consideration that larger values of N may decrease the latency but the video fidelity and/or coding rate may be impacted due to smaller portions being encoded. The frames in FIG. 3 will be referred to with similar labels as in FIG. 2, but with a sub-index number added. For example, the first unencoded frame F1 has four portions that will be referred to as F1-1, F1-2, F1-3, and F1-4. Similarly, the first encoded frame, for example, has portions E1-1 through E1-4, and the first Tx/mux frame has container portions M1-1 to M1-4.

FIG. 1 shows unencoded frame portions 120 passing from the framebuffer 106 to the encoder 108. FIG. 1 also shows encoded frame portions 122 passing from the encoder 108 to the Tx/mux 110. FIG. 1 further shows container portions outputted by the Tx/mux 110 for transmission by the communication facilities (e.g., network stack and communication interface 111) of the host 100. The frame portions 120 may be any of the frame portions FX-Y (e.g., F1-1) shown in FIG. 3. The encoded portions 122 may be any of the encoded portions EX-Y (e.g., E2-4), and the container portions 124 may be any of the container portions MX-Y (e.g., M1-3).

Figure 4:
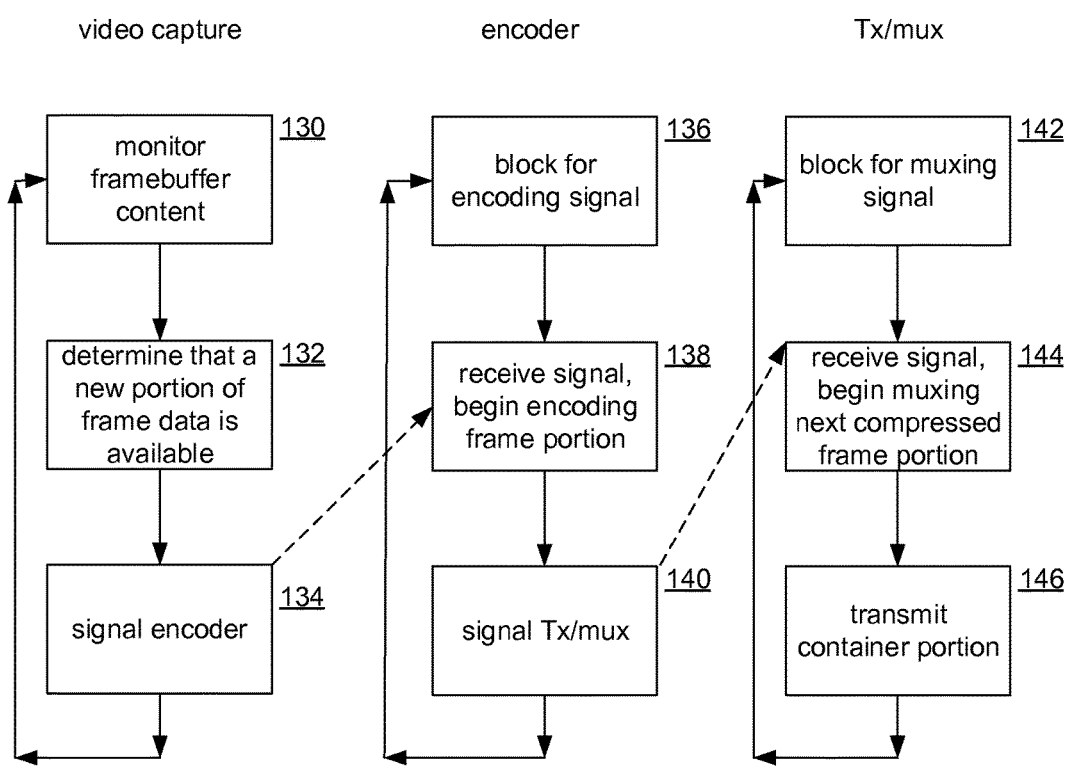
FIG. 4 shows how a framebuffer, an encoder, and a transmitter/multiplexer (Tx/mux) can be configured to process portions of frames concurrently.

FIG. 4 shows how the framebuffer 106, the encoder 108, and the Tx/mux 110 can be configured to process portions of frames concurrently, possibly even before a video frame is completely generated and fills the framebuffer 106. Initially, as in FIG. 2, the application 104 begins to generate video data, which starts to fill the framebuffer 106. At step 130, the video capture hardware is monitoring the framebuffer 106. At step 132 the video capture hardware determines that the framebuffer 106 contains a new complete portion of video data, and, at step 134, signals the encoder 108.

At step 136 the encoder 108 is blocked (waiting) for a portion of a video frame. At step 138 the encoder 108 receives the signal that a new frame portion 120 is available. In this example, the first frame portion will be frame F1-1.

At step 140 the encoder 108 signals the Tx/mux 110 that an encoded portion 122 is available. In this case, the first encoded portion is encoded portion E1-1 (the encoded form of frame portion F1-1).

At step 142 the Tx/mux 110 is block-waiting for a signal that data is available. At step 144 the Tx/mux 110 receives the signal that encoded portion E1-1 is available, copies or accesses the new encoded portion, and in turn the Tx/mux 110 multiplexes the encoded portion E1-1 with any corresponding audio data. The Tx/mux 110 outputs the container portion 124 (e.g., M1-1) for transmission to the client 102.

It should be noted that the aforementioned components operate in parallel. When the capture hardware has finished a cycle at step 134 the capture hardware continues at step 130 to check for new video data while the encoder 108 operates on the output from the framebuffer 106 and while the Tx/mux 110 operates on the output from the encoder 108. Similarly, when the encoder 108 has finished encoding one frame portion it begins a next, and when the Tx/mux 110 has finished one encoded portion it begins a next one, if available.

As can be seen in FIG. 3, by reducing the granularity of processing from frames to portions of frames, it is possible to reduce the latency between the initiation of video generation and the transmission of the appropriately processed generated video. Synchronization between the pipeline components can be accomplished in a variety of ways. As described above, each component can generate a signal for the next component. Timers can be used to assure that each component does not create a conflict by failing to finish processing a portion in sufficient time. For example, if frames are partitioned into four portions, and the refresh cycle is 16 ms, then each component might have a 4 ms timer. In practice, the time will be a small amount less to allow for overhead such as interrupt handling, data transfer, and the like. In another embodiment, the graphics pipeline is driven by the vsync signal and each component has an interrupt or timer appropriately offset from the vsync signal (e.g., ~4 ms). Different components can generate interrupts as a mechanism to notify the next component in pipeline that the data is ready for their consumption. Any combination of driver signals, timers, and inter-component signals, implemented either in hardware, firmware, or drivers, can be used to synchronize the pipeline components.

Details about how video frames can be encoded by portions or slices are available elsewhere; many video encoding standards, such as the H.264 standard, specify features for piece-wise encoding. However, embodiments will work even if video standard does not have concept of slices, or encoder is configured to use single slice encoding. An encoder can be limited to the portion of video available for motion search. That is, while encoding E1-1, the encoder will limit access of the motion search to only the E1-1 portion. In addition, the client 102 need not be modified in order to process the video stream received from the host 100. The client 102 receives an ordinary containerized stream. An ordinary decoder at the client 102 can recognize the encoded units (portions) and decode accordingly. In one embodiment, the client 102 can be configured to decode in portions, which might marginally decrease the time needed to begin displaying new video data received from the host 100.

In a related aspect, latency or throughput can be improved in another way. Most encoding algorithms create some form of dependency between encoded frames. For example, as is well understood, time-variant information, such as motion, can be detected across frames and used for compression. Even in the case where a frame is encoded in portions, as described above, some of those portions will have dependencies on previous portions. The embodiments described above can end up transmitting individual portions of frames in different frames or packets. A noisy channel that causes intermittent packet loss or corruption can create problems because loss/corruption of a portion of a frame can cause the effective loss of the entire frame or a portion thereof. Moreover, a next Pframe/Bframe (predicted frame) may not be decodable without the good reference. For convenience, wherever the terms "Pframe" and "PSlice" are used herein, such terms are intended to represent predictively encoded frames/slices, or bi-directionally predicted frames/slices (Bframes/Bslices), or both. In other words, where the context permits, "PFrame" refers to "Pframe and/or Bframe", and "PSlice" refers to "PSlice and/or Bslice". Described next are techniques to refresh (allow decoding to resume) a disrupted encoded video stream without requiring transmission of a full Iframe (intracoded frame).

Figure 5:
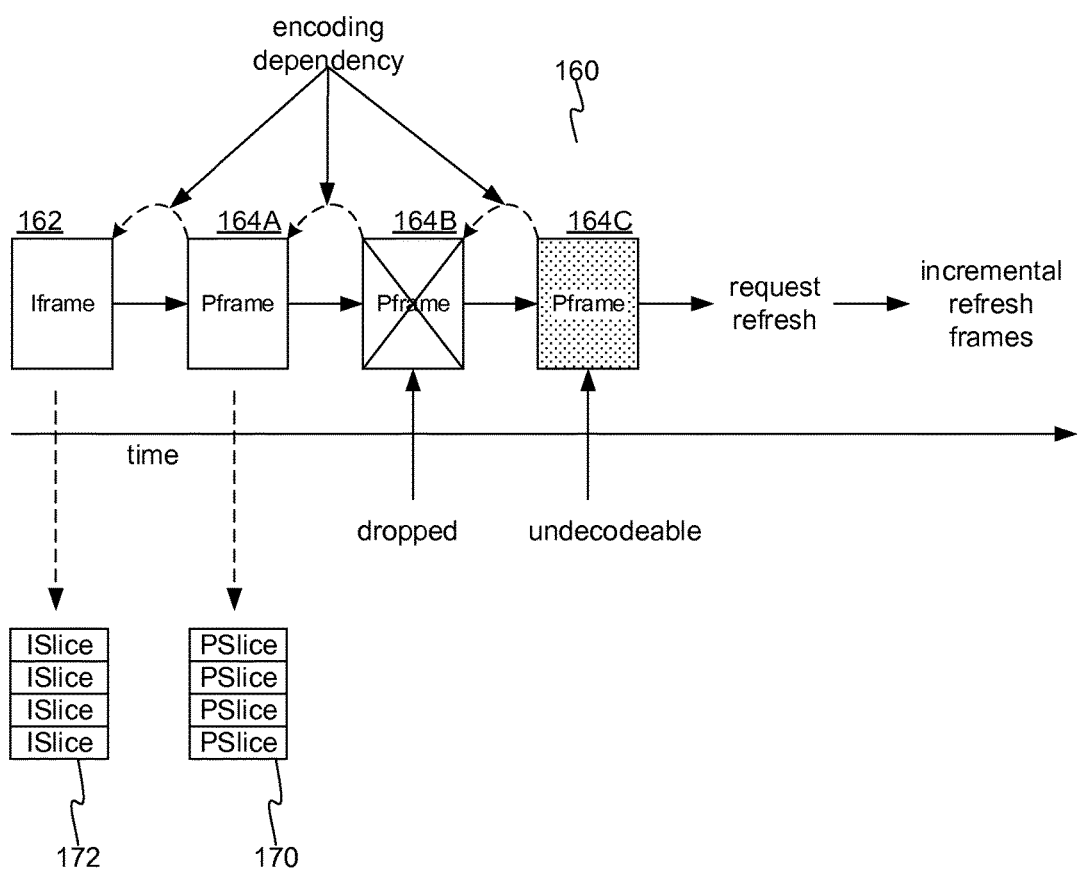
FIG. 5 shows a sequence of encoded video frames transmitted from the host to the client.

FIG. 5 shows a sequence 160 of encoded video frames transmitted from the host 100 to the client 102. As is known in the art of video encoding, frames can be encoded based on changes between frames (Pframes 164A-164C) or based only on the intrinsic content of one frame (Iframes 162). An Iframe can be decoded without needing other frames, but Iframes are large relative to Pframes and Bframes. Pframes, on the other hand, depend on and require other frames to be decoded cleanly. As shown in FIG. 5, when Pframe 164B is not available for decoding, perhaps due to packet loss or corruption during transmission, the next Pframe 164C cannot be decoded. Prior approaches would require a new Iframe each time a Pframe was effectively not available for decoding. Embodiments described next allow an encoded video stream to be recovered with low latency and with near-certainty and reasonable fidelity.

As is also known and discussed above, many video encoding algorithms and standards include features that allow slice-wise encoding. That is, a video frame can have intra-encoded (self-decodable data) portions or slices, as well as predictively encoded portions or slices. The former are often referred to as ISlices, and the latter are often referred to as PSlices. As shown in FIG. 5, a Pframe can be encoded as set of PSlices 170, and an Iframe can be encoded as a set of ISlices 172. It is also possible for an encoded frame to have a mix of ISlices 172 and PSlices 170, with the PSlices of one frame being dependent on PSlices and/or ISlices of the previous frame. Slice-based encoding can be helpful for a pipeline that works with portions of frames rather than whole frames, as described above. In addition, smaller pieces of encoded data such as PSlices and ISlices can be individually transmitted across a wireless link or other potentially lossy medium, which can help with data retransmission. If a slice is unavailable for decoding, only that slice might need to be retransmitted in order to recover. Nonetheless, in some situations, an entire frame might be unavailable for decoding.

Figure 6:
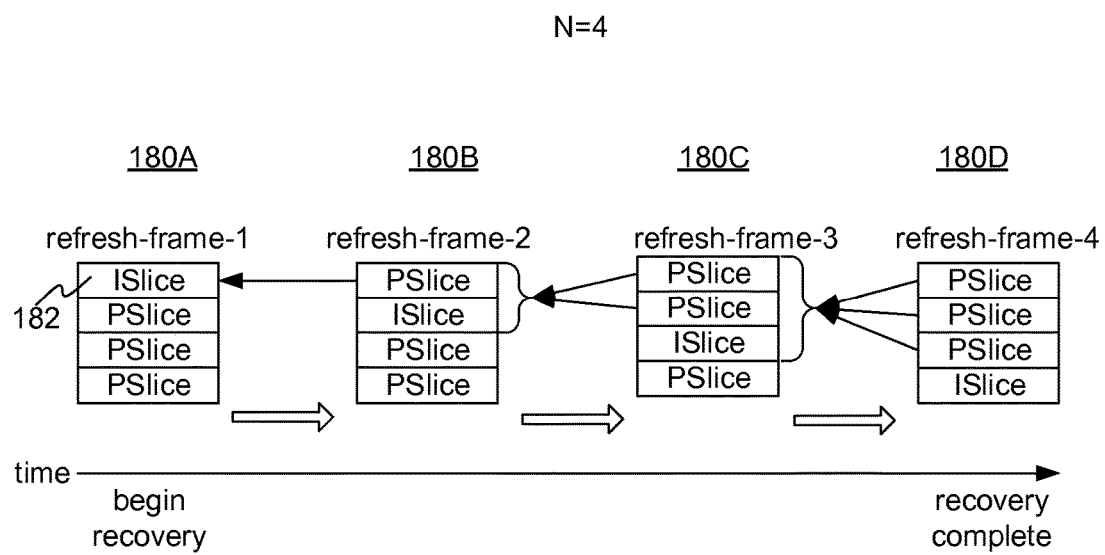
FIG. 6 shows how a video stream can be recovered when a Pframe becomes unavailable for decoding.

FIG. 6 shows how a video stream can be recovered when a Pframe becomes unavailable due to packet loss, corruption, misordering, etc. When the client 102 provides feedback to the host 100 that a frame has been corrupted or lost, the host 100 transmits a sequence of frames that together include sufficient ISlices to refresh the video stream. Supposing that Pframe 164B has been dropped, a first refresh-frame 180A is encoded with a corresponding ISlice 182 and a remainder of PSlices br. A next refresh-frame, second refresh-frame 180B, is then encoded with a second ISlice in the next slice position. The third refresh-frame 180C is similarly encoded with an ISlice at the next slice position (the third slice position). The fourth refresh-frame 180D is encoded with an ISlice at the fourth and last slice position (partitions other than four slices may be used).

The other slices of each refresh-frame are encoded as PSlices. However, because only portions of a previous refresh-frame may be valid, the encoding of any given PSlice may involve restrictions on the spatial scope of scans of the previous frame. That is, scans for predictive encoding are limited to those portions of the previous frame that contain valid encoded slices (whether PSlices or ISlices). In one embodiment where the encoding algorithm uses a motion vector search for motion-based encoding, the motion vector search is restricted to the area of the previous refresh-frame that is valid (i.e., the intra-refreshed portion of the previous frame). In the case of the second refresh-frame 180B, predictive encoding is limited to only the ISlice of the first refresh-frame 180A. In the case of the third refresh-frame 180C, predictive encoding is limited to the first two slices of the second refresh-frame 180B (a PSlice and an ISlice). For the fourth refresh-frame 180D, predictive encoding is performed over all but the last slice of the third refresh-frame 180C. After the fourth refresh-frame 180D, the video stream has been refreshed such that the current frame is a complete validly encoded frame and encoding with mostly Pframes may resume.

While different patterns of ISlice positions may be used over a sequence of refresh-frames, the staggered approach depicted in FIG. 6 may be preferable because it provides a contiguous searchable frame area that increases in size with each refresh-frame; the first refresh-frame has a one-slice searchable area, the next has a two-slice searchable area, and so forth. Moreover, the searchable area grows with the addition of predictively encoded slices (PSlices) and therefore is encoded with a minimal amount of intra-encoded data in any given intra-refresh frame.

Figure 7:
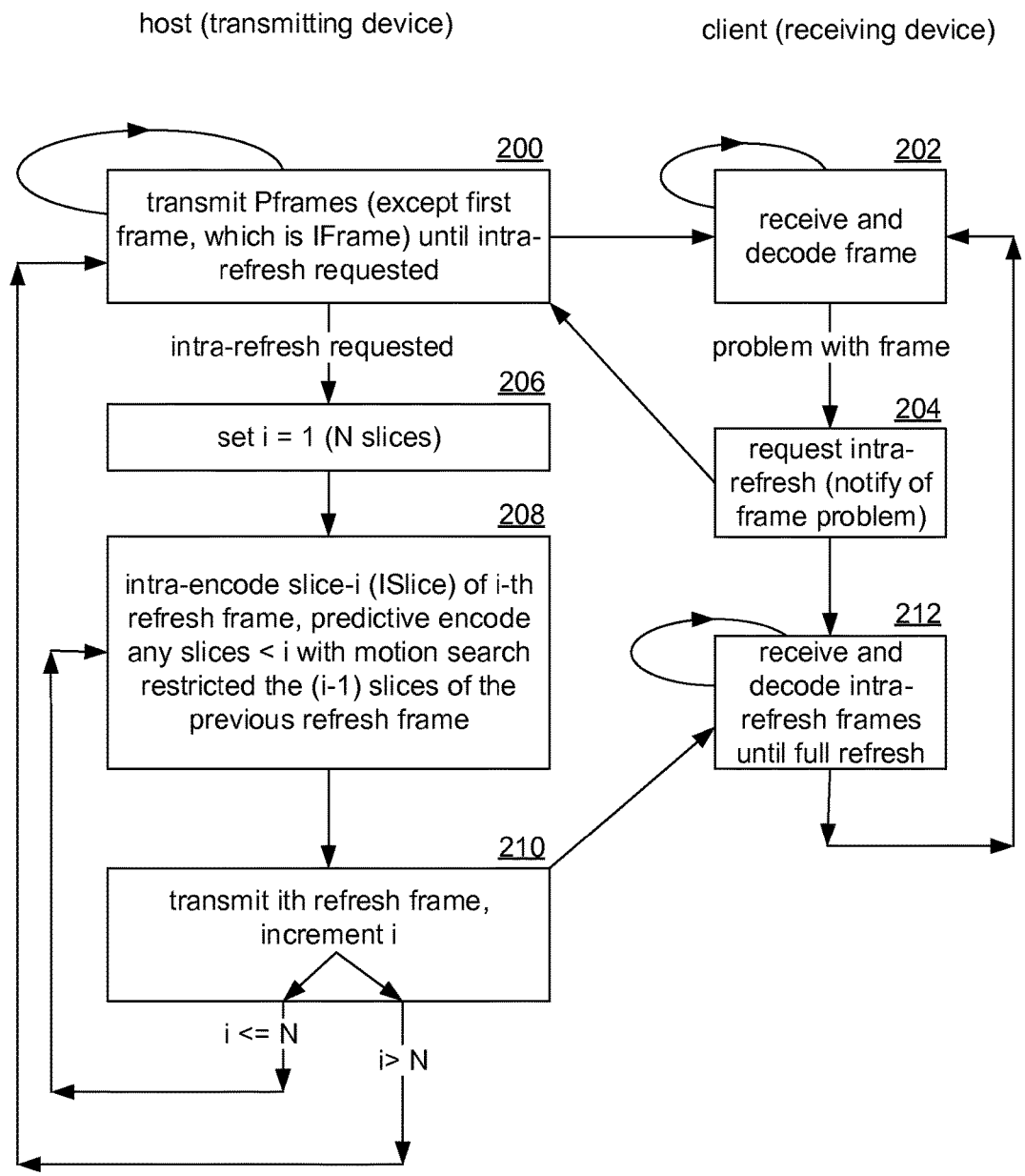
FIG. 7 shows a process for performing an intra-refresh when encoded video data is unavailable.

FIG. 7 shows a process for performing an intra-refresh when encoded video data is unavailable. At step 200, the host 100 is transmitting primarily Pframes, each dependent on the previous for decoding. At step 202, the client 102 receives the Pframes and decodes them using the previous Pframes. While receiving the Pframes, the client 102 detects a problem with a Pframe (e.g., missing, corrupt, out of sequence, etc.). Missing encoded data can be detected at the network layer, at the encoding layer, at the decoding layer or any combination of these. In response to the missing Pframe, at step 204 the client 102 transmits a message to the host 100 indicating which frame was not able to be decoded by the client 102. At step 206 the host 100 begins sending intra-refresh frames. A loop can be used to incrementally shift the slice to be intra-encoded (encoded as an ISlice) down after each frame. At step 208, the current intra-refresh frame is encoded. For the i-th refresh-frame, the i-th slice is encoded as an ISlice. The slices above the i-th slice (if any) are predictively encoded as PSlices. Moreover, when encoding any PSlices, the predictive scanning for those PSlices (in particular, a search for a motion vector) is limited in scope to the refreshed portion of the previous frame (an ISlice and any PSlices above it). After an i-th refresh-frame has been encoded it is transmitted at step 210 and the iteration variable i is incremented until a refresh-frame with N (e.g., four) valid slices has been transmitted, such as the fourth refresh-frame 180D shown in FIG. 6.

As the refresh-frames are transmitted, at step 212 the client receives the refresh-frames and decodes them in sequence until a fully valid frame has been reconstructed, at which time the client 102 resumes receiving and decoding primarily ordinary Pframes at step 202.

In some implementations, the use of slices that are aligned from frame to frame can create striations artifacts; seams may appear at slice boundaries. This effect can be reduced with several techniques. Dithering with randomization of the intra-refresh slices can be used for smoothening. Put another way, instead of using ISlices, an encoder may encode different blocks as intra blocks in a picture. The spatial location of these blocks can be randomized to provide a better experience. To elaborate on the dithering technique, the idea is that, instead of encoding I-macroblocks consecutively upon a transmission error or the like, spread out the I-macroblocks across the relevant slice. This can help avoid the decoded image appearing to fill from top to bottom. Instead, with dithering, it will appear that the whole frame is getting refreshed. To the viewer it may look like the image is recovered faster.

To optimize performance, conditions of the channel between the host 100 and the client 102 can be used to inform the intra-refresh encoding process. Parameters of intra-refresh encoding can be targeted to appropriately fit the channel or to take into account conditions on the channel such as noise, packet loss, etc. For instance, the compressed size of ISlices can be targeted according to estimated available channel bandwidth. Slice QP (quantization parameter), and MB (macro-block) delta can be adjusted adaptively to meet the estimated target.

Figure 8:
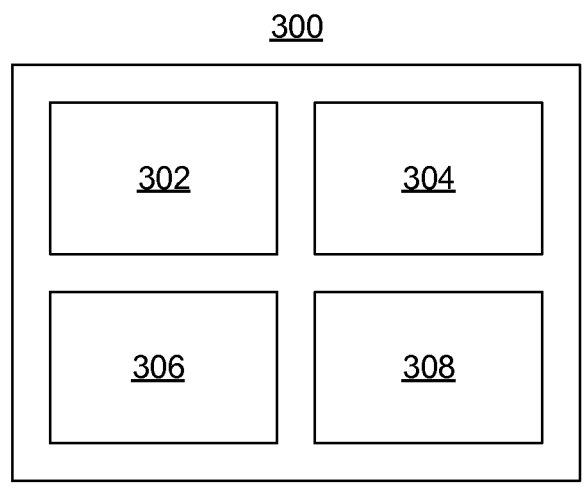
FIG. 8 shows an example of a computing device.

FIG. 8 shows an example of a computing device 300. One or more such computing devices are configurable to implement embodiments described above. The computing device 300 comprises storage hardware 302, processing hardware 304, networking hardware 306 (e.g. network interfaces, cellular networking hardware, etc.). The processing hardware 304 can be a general purpose processor, a graphics processor, and/or other types of processors. The storage hardware can be one or more of a variety of forms, such as optical storage (e.g., compact-disk read-only memory (CD-ROM)), magnetic media, flash read-only memory (ROM), volatile memory, non-volatile memory, or other hardware that stores digital information in a way that is readily consumable by the processing hardware 304. The computing device 300 may also have a display 308, and one or more input devices (not shown) for users to interact with the computing device 300.

The embodiments described above can be implemented by information in the storage hardware 302, the information in the form of machine executable instructions (e.g., compiled executable binary code), source code, bytecode, or any other information that can be used to enable or configure the processing hardware to perform the various embodiments described above. The details provided above will suffice to enable practitioners of the invention to write source code corresponding to the embodiments, which can be compiled/translated and executed.

The invention claimed is:

1. A computing device comprising:
   processing hardware and storage hardware, the storage hardware storing an application that when executed by the processing hardware generates video frames;
   a display;
   a framebuffer configured to store the video frames generated by the processing hardware, the framebuffer operationally connected with an encoder, wherein each video frame comprises segments, the computing device configured to display the framebuffer on the display at intervals that correspond to a refresh rate; and
   the encoder configured to compress the video frames, wherein the computing device is configured to generate a signal when a segment of a video frame is stored in the framebuffer, wherein, based on the signal, the encoder receives a segment of a video frame from the framebuffer before other segments of the video frame have been fully generated and stored in the framebuffer, wherein the encoder begins encoding the received segment of the video frame before the video frame completely fills the framebuffer, and wherein during a single interval the video frame has: a first segment being stored into the framebuffer, and a second segment being compressed by the encoder from the framebuffer.

2. A computing device according to claim 1, further comprising a multiplexer configured to multiplex the compressed video frames with audio data, wherein the multiplexer receives a compressed segment of the video frame and begins multiplexing the compressed segment with the audio data before receiving from the encoder a next compressed segment of the video frame.

3. A computing device according to claim 2, wherein during a single interval the video frame has: the first segment being stored into the framebuffer, the second segment being compressed by the encoder from the framebuffer, and a third segment being multiplexed with the audio data by the multiplexer.

4. A computing device according to claim 1, wherein the video frames are partitioned into segments, wherein a given video frame comprises a first segment and a second segment, and wherein the first segment is compressed and outputted by the encoder before the encoder receives the second segment.

5. A computing device according to claim 4, further comprising a multiplexer that prepares the video frames for transmission by the computing device, wherein the given video frame comprises a third segment, and wherein the multiplexer is multiplexing the third segment while the encoder is compressing the first segment.

6. A computing device according to claim 1, wherein the encoder begins compressing the segment of the video frame from the framebuffer before the video frame is finished being generated by an application being executed by the processing hardware.

7. A computing device according to claim 6, wherein the encoder implements a video compression algorithm that performs both inter-frame and intra-frame encoding of video frame segments.

8. A computing device according to claim 1, wherein the displaying from the frame buffer and the encoding are both synchronized with a refresh signal that cycles at the refresh rate.

9. A method, performed by a computing device, to perform concurrent encoding and multiplexing of video frames, the method comprising:
receiving, from processing hardware of the computing device, a second portion of a video frame at a framebuffer, and based on the complete second portion being stored in the framebuffer, generating a signal;
displaying each of the video frames from the framebuffer as they are respectively stored in the framebuffer;
after generating the signal, beginning to receive, from the processing hardware of the computing device, a first portion of a video frame at the framebuffer, wherein the first and second portions of the video frame are received from a source that generates the video frames and renders the video frames to the framebuffer; and based on the signal, encoding, by a video encoding hardware module, the second portion of the video frame received from the framebuffer, wherein the encoding of the second portion begins before the first portion of the video frame is fully stored in the framebuffer.

10. A method according to claim 9, further comprising, while encoding the second portion and while the first portion is being written to the framebuffer, formatting a third portion of the video frame into a video streaming container.

11. A method according to claim 10, further comprising, while encoding the second portion and while the first portion is being written to the framebuffer: transmitting a network protocol frame comprising a portion of the video streaming container that comprises a third portion of the video frame, the third portion having been encoded by the compression module and having been multiplexed with audio data.

12. A method according to claim 9, wherein the framebuffer operates as a frontbuffer and/or a backbuffer, and wherein the framebuffer is connected with a display driver of the computing device to display video frames from the framebuffer without the displayed video frames passing through the compression hardware module.

13. A method according to claim 9, wherein processing of the portions are synchronized by a timer or interrupt signal.

14. A method according to claim 9, wherein a vertical-sync signal drives the displaying and wherein the displaying is synchronized with the vertical-sync signal.

15. A computing device comprising:
a graphics pipeline comprising a framebuffer, an encoder, and a multiplexor, the graphics pipeline configured to receive video frames newly generated to the frame buffer by application software on the computing device and to output a video stream comprised of the video frames encoded multiplexed with audio data, wherein the framebuffer supplies video frame portions to a video encoder and the encoder supplies encoded video frame portions to the multiplexer; and
the computing device configured such that, when operating, the framebuffer will receive a first portion of a video frame while the encoder encodes a second portion of the video frame and while the multiplexer concurrently multiplexes audio data with a third portion of the video frame with audio data, the computing device further configured such that, when operating, the multiplexor multiplexes the encoded third portion of the video frame before receiving the first portion of the video frame.

16. A computing device according to claim 15, wherein the encoder implements either an H.264/AVC (advanced video coding) or an H.265/HEVC (high efficiency video coding) standard.

17. A computing device according to claim 15, wherein the multiplexor packages portions of the video frames encoded by the encoder into a video streaming format.

18. A computing device according to claim 15, further comprising processing hardware configured to generate the video frames.

19. A computing device according to claim 15, wherein the framebuffer, the encoder, and the multiplexor are synchronized in correspondence with a vertical-sync signal.

* * * * *